US012736225B2

(12) United States Patent
Etxebarrieta Alonso et al.

(10) Patent No.: US 12,736,225 B2
(45) Date of Patent: Sep. 15, 2026

(54) COOKING APPLIANCE COMPRISING A RADIANT HEATER

(71) Applicant: EIKA, S.COOP., Etxebarria (ES)

(72) Inventors: Agustín Etxebarrieta Alonso, Forua (ES); Jon Endika Azpiritxaga Zalbide, Durango (ES); Daniel De Los Toyos López, Eibar (ES)

(73) Assignee: EIKA, S.COOP., Etxebarria (ES)

( * ) Notice: Subject to any disclaimer, the term of this patent is extended or adjusted under 35 U.S.C. 154(b) by 632 days.

(21) Appl. No.: 18/343,019

(22) Filed: Jun. 28, 2023

(65) Prior Publication Data

US 2023/0341130 A1 Oct. 26, 2023

Related U.S. Application Data

(63) Continuation of application No. PCT/ES2021/070907, filed on Dec. 20, 2021.

(30) Foreign Application Priority Data

Dec. 28, 2020 (ES) ............................ ES202032792U

(51) Int. Cl.
*F24C 7/08* (2006.01)
*F24C 15/10* (2006.01)
*H05B 1/02* (2006.01)
*H05B 3/74* (2006.01)

(52) U.S. Cl.
CPC ............ *F24C 7/083* (2013.01); *F24C 15/102* (2013.01); *H05B 1/0266* (2013.01); *H05B 3/746* (2013.01); *H05B 2213/07* (2013.01)

(58) Field of Classification Search
CPC ...... F24C 15/102; F24C 7/083; H05B 1/0266; H05B 2213/07; H05B 3/746
USPC ........................................................ 219/200
See application file for complete search history.

(56) References Cited

U.S. PATENT DOCUMENTS

| | | | | |
|---|---|---|---|---|
| 5,491,423 | A * | 2/1996 | Turetta | G01V 3/088 340/568.1 |
| 5,877,475 | A | 3/1999 | Hecht et al. | |
| 2002/0088792 | A1 | 7/2002 | Bates et al. | |
| 2017/0268935 | A1* | 9/2017 | Hua | G01K 1/143 |

FOREIGN PATENT DOCUMENTS

EP 0789503 A2 8/1997

OTHER PUBLICATIONS

International Search Report and the Written Opinion, PCT/ES2021/070907, Mar. 10, 2023, 12 pages.

* cited by examiner

*Primary Examiner* — Sang Y Paik
(74) *Attorney, Agent, or Firm* — Edell, Shapiro & Finnan, LLC

(57) ABSTRACT

A radiant burner for a cooking appliance. The radiant heater includes a heating element residing on or in an insulating base, the insulating base having a recess located in a bottom thereof. The insulating base is housed in a casing that has a recess residing in the recess of the insulating base. A part of the casing that forms the recess includes a guide. A temperature sensor configured to measure a temperature inside the radiant burner is supported by an insulating body. A portion of the insulating body is located inside the insulating base and inside the guide formed by the casing with the insulating body extending vertically through the insulating base and the guide.

11 Claims, 9 Drawing Sheets

COOKING APPLIANCE COMPRISING A RADIANT HEATER

CROSS-REFERENCE TO RELATED APPLICATIONS

This application relates to and claims the benefit and priority to International Appl. No. PCT/ES2021/070907, Dec. 20, 2021, which claims the benefit and priority to Spanish Utility Model Appl. No. U202032792, filed Dec. 28, 2020, each of which is incorporated herein by reference in its entirety.

TECHNICAL FIELD

The present invention relates to cooking appliances comprising at least one radiant burner.

BACKGROUND

Radiant burners known in the state of the art comprise a safety device for overheating and the subsequent breaking due to thermal stress of the glass ceramic. These devices are normally electromechanical devices which pass through the insulating ring of the radiant burner, being arranged on the corresponding radiant element.

In addition, radiant burners which furthermore include temperature sensors are known, the purpose of which is to measure the temperature of the glass ceramic cooking hob through which the temperature of the vessel arranged on the corresponding radiant burner can be controlled, as described in US2016174299A1, which discloses a radiant burner adapted to a cooking hob comprising a temperature sensor adapted to measure the temperature of the cooking hob and elastic means adapted to keep the temperature sensor in permanent contact with the cooking hob.

SUMMARY

Provided is a cooking appliance comprising at least one radiant burner.

The cooking appliance according to the invention comprises at least one radiant burner comprising an insulating base, at least one heating element, a casing which houses therein the insulating base and a temperature sensor to measure the temperature inside the radiant burner, and control means configured to cut off the power supply of the heating element when the temperature sensor detects inside the radiant burner a temperature greater than a predetermined temperature, the control means being electronic control means configured to furthermore control the power supplied to each radiant burner through the temperature measured by the temperature sensor.

The control means of the cooking appliance has a dual function based on the data provided through the single temperature sensor of the radiant burner: in addition to working as safety means, they control/manage the power supplied to each radiant burner. This latter function enables the viability of cooking in a closed loop system in which the user chooses a working temperature which is kept constant by means of the continuous monitoring of the temperature and management of the heating power of the respective radiant burner.

The radiant burner comprises an insulating body fixed to the insulating base which extends substantially orthogonal to said insulating base, said insulating body supporting the temperature sensor. Therefore, in addition to detecting temperatures which the radiant burner should not exceed for safety reasons, the temperature sensor detects with a fairly good estimate the temperature of the pot arranged on the glass ceramic.

The cooking appliance obtained is more efficient; each radiant burner includes a single temperature sensor, said sensor does not pass through the ring, thereby reducing the height of the insulating ring which is the insulating part of the radiant burner with the lowest thermal insulating capacity, which means that energy losses through said insulating ring decrease. Furthermore, since the height of the insulating ring is smaller, the distance of the heating element to the glass ceramic cooktop decreases, whereby bringing the heat source closer to the element to be heated on the glass ceramic cooktop.

These and other advantages and features will become apparent in view of the figures and detailed description.

DETAILED DESCRIPTION

Figure 1:
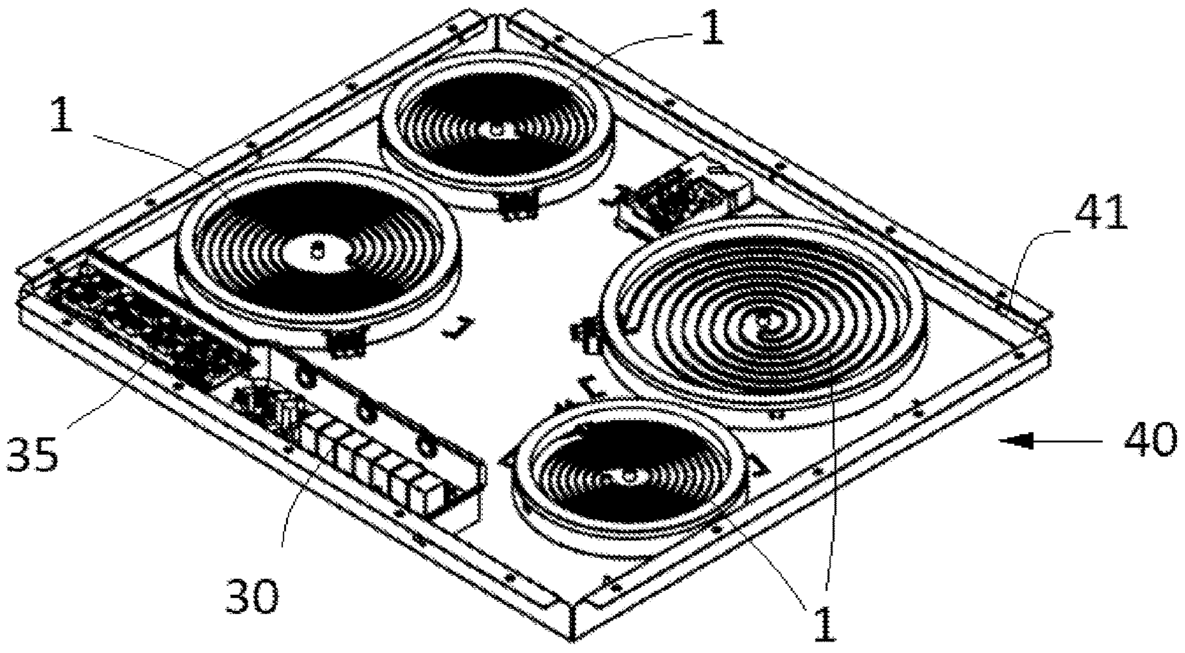
FIG. 1 shows a perspective view of a cooking appliance having several radiant burners.
Figure 2:
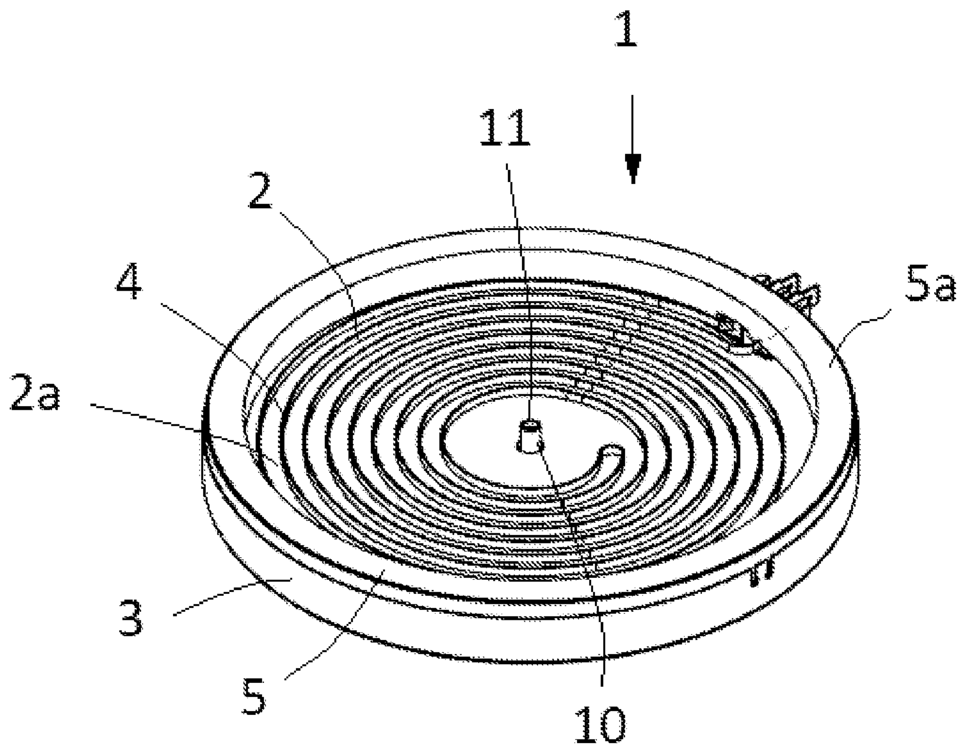
FIG. 2 shows a perspective view of a radiant burner comprised in a first embodiment of the cooking appliance of FIG. 1.
Figure 3:
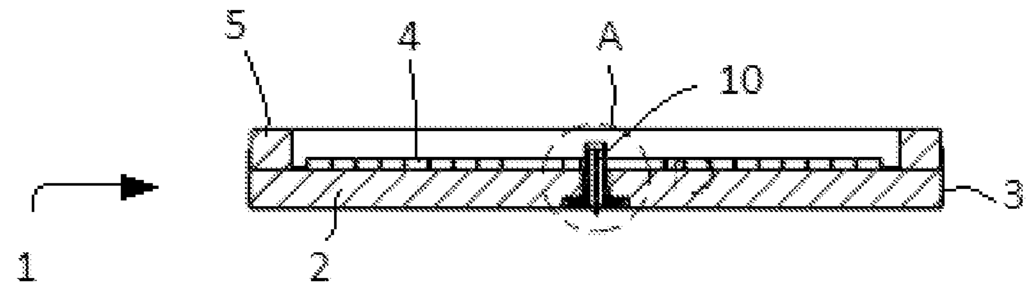
FIG. 3 shows a section view of the radiant burner shown in FIG. 2.

FIG. 1 shows a cooking appliance 100 according to the invention comprising radiant burners 1, the radiant burners being electrical radiant burners.

Each radiant burner 1 comprises an insulating base 2, having a substantially planar top surface 2*a* on which at least one heating element 4 is fixed, an insulating ring 5 which is supported on the insulating base 2, and a metal casing 3, the casing 3 housing therein said insulating base 2 and, partially, said insulating ring 5. The casing 3 is adapted to the outer geometry of the insulating base 2 and to the insulating ring 5.

The heating element 4 is an electrical resistor which can be a metal strip or wire-wound resistor, as known in the state of the art. The insulating base 2 is made of a uniform, microporous material that is a good thermal insulator, has good mechanical properties, and is resistant to moisture absorption. The insulating ring 5 is made of a thermally insulating material that has good mechanical properties, as well as a high temperature resistance. The insulating ring 5 is made of a material that is denser than the material of the insulating base 2 because of the mechanical requirements to which it is subjected, which means that it has higher thermal losses.

The radiant burner 1 further comprises a temperature sensor 10 to measure the temperature inside the radiant burner 1. The cooking appliance 100 comprises control means 30 configured to cut off the power supply of the heating element 4 when the temperature sensor 10 detects inside the radiant burner 1 a temperature greater than a predetermined temperature or a certain temperature variation with respect to the time, the origin of which is improper operation of the radiant burner. The temperature sensor 10 is supported by an insulating body 11 fixed to the insulating base 2, which extends substantially orthogonal to the insulating base 2 of the radiant burner 1, supporting said insulating body 11 the temperature sensor 10. The control means 30 is electronic control means configured to furthermore control the power supplied to each radiant burner 1 through the temperature measured by the temperature sensor 10.

The radiant burner 1 has a smaller height than the radiant burner of the state of the art, so the energy efficiency thereof is maximized. The insulating ring 5 has a maximum height of about 12 mm. Taking into account that the insulating ring 5 has worse insulating properties than the insulating base 2, since its mechanical requirements mean that it has to be denser and the higher the density the worse the insulation, by enabling the height of the insulating ring 5 to be reduced a more energy efficient radiant burner 1 is obtained.

Moreover, when the glass ceramic cooktop is subjected to a very high temperature, for example, above 500° C., it behaves like a conductive material. Existing regulations require the radiant burner to be able to withstand a test simulating the entry of a 3,000 V ray between the pot arranged on the radiant burner and the heating elements. To overcome this test, the glass ceramic cooktop must be separated from the heating element 4 a distance of at least about 8 mm. The insulating ring 5 of each radiant burner 1 has the maximum height which enables complying with said safety regulation.

Additionally, the temperature sensor 10 is arranged supported at one end of the insulating body 11, the insulating body 11 passing through the wires of the temperature sensor 10. In the embodiments shown in FIGS. 2 to 8, the insulating body 11 comprises holes 12 through each of which the corresponding electrical wire of the temperature sensor 10 goes. In other embodiments not shown in the figures, the insulating body 11 is hollow and includes an inner wall that delimits two cavities such that each electrical wire of the temperature sensor 10 passes through the cavity respective. The inner wall can be a separate element of the insulating body.

The insulating body 11 is made of a ceramic material. Preferably, the insulating body 11 is a substantially cylindrical body. Said insulating body 11 is arranged inserted in the insulating base 2 of the radiant burner 1 such that it is kept substantially orthogonal to said insulating base 2, ensuring the correct positioning of the temperature sensor 10 with respect to the heating element 4.

The temperature sensor 10 does not directly contact the glass ceramic cooktop, but rather it is the insulating ring 5 that directly contacts the glass ceramic cooktop, the temperature sensor 10 being arranged at a minimum distance from the glass ceramic cooktop that allows measuring a temperature fairly similar to the temperature of the cooking utensil arranged on the radiant burner 1. The temperature sensor 10 is arranged at a distance from the corresponding heating element 4 of at least about 0.5 mm, preferably at least 4 mm.

In a preferred embodiment, the insulating body 11 comprises a housing 13 at one end in which the temperature sensor 10 is housed. The housing 13 is delimited by side walls 14 that thermally protect the temperature sensor 10 against direct radiations of the heating element 4, such that the reading precision of the temperature sensor 10 increases, where the temperature is similar to the temperature of the glass ceramic cooktop, and therefore of the pot arranged on the glass ceramic cooktop.

Moreover, the insulating body 11 is arranged partially inserted in the insulating base 2, being retained against the casing 3 through retaining means 20 comprising flexible tabs 22 surrounding the insulating body 11 and configured to retain the insulating body 11 once said insulating body 11 passes through the retaining means 20, impeding the movement of said insulating body 11 in the opposite direction relative to the insertion direction.

Figure 9A:
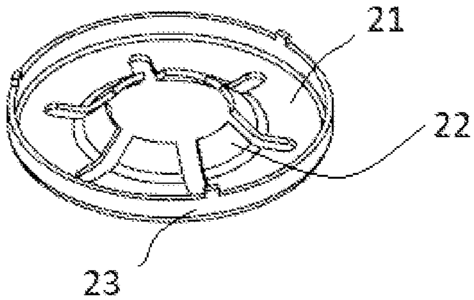
FIGS. 9A-9C show different examples of retaining means comprised in a radiant burner of a cooking appliance.
Figure 9B:
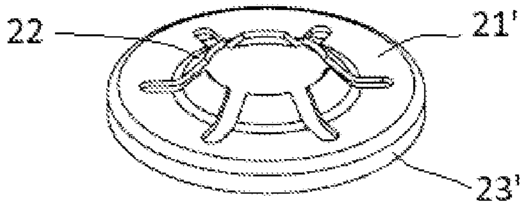
Figure 9C:
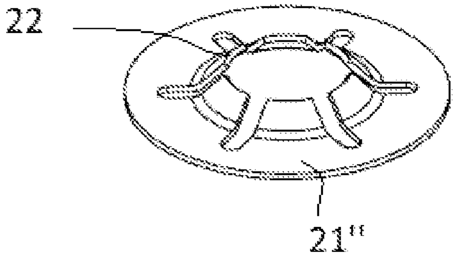

FIGS. 9A to 9C show different examples of the retaining means 20. In all of these examples, the retaining means 20 comprise a retaining element 21, 21' and 21" including the flexible tabs 22. The retaining element 21, 21' and 21" is a washer on the inner diameter of which the flexible tabs 22 are arranged. In FIG. 9A, the retaining element 21 includes an outer rim 23 configured to abut against the casing 3 of the radiant burner 1. In FIG. 9B, the retaining element 21' includes an outer rim 23', but in this case, the base of the washer abuts against the casing 3 of the radiant burner. The retaining element 21, 21' and 21" is arranged housed in a corresponding recess **2*b* of the insulating base 2, said recess 2*b* being covered by the casing 3 which includes in said area a corresponding recess 3*b*. Therefore, the insulating body 11 does not project below the casing 3, avoiding possible impacts that may move the insulating body 11 and, with it, the temperature sensor 10. The movement would affect the proper control of the radiant burner 1, given that by modifying the distance of the sensor with respect to the glass ceramic cooktop, the predetermined control parameters would change. Additionally, this enables packaging the radiant burners stacked on one another, with the substantially planer surfaces of the respective casings 3** being arranged facing one another.

In the embodiments shown in the figures, each of the retaining elements 21, 21' and 21" is fixed to the casing 3 by pressure, welding, adhesive, or other fixing means.

Figure 8:
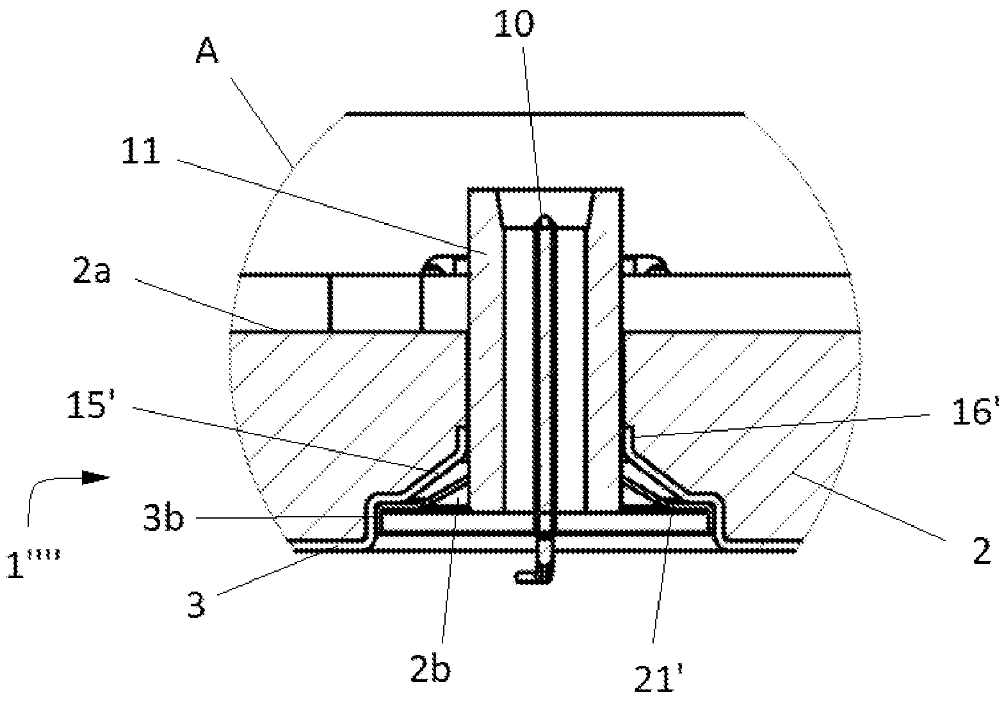
FIG. 8 shows detail A of a radiant burner according to another embodiment.

In another example shown in FIG. 8, the retaining means 20 comprise a second retaining element 24 which retains the insulating body 11 against the top surface **2*a* of the insulating base 2. The second retaining element 24 is identical to the retaining element 21 housed in the housing 2*b* of the insulating base 2. Both retaining elements 21 act like a sandwich, retaining the insulating body 11 against the insulating base 2 and the casing 3**.

Figure 4:
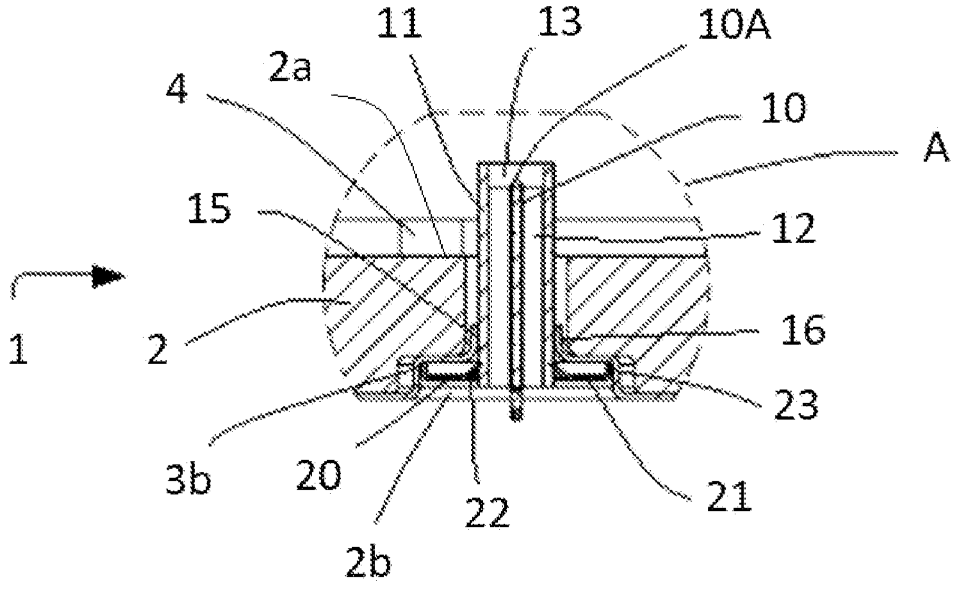
FIG. 4 shows detail A of the radiant burner shown in FIG. 3 according to one embodiment.

Moreover, the radiant burner 1 comprises guide means 15, shown in detail in FIG. 4, configured to guide the assembly of the insulating body 10 and keep it substantially orthogonal with respect to the insulating base 2. FIGS. 5 to 8 show examples of different guide means 15' and 15", with the rest of the features of the radiant burners 1', 1", 1'" and 1"" being identical to those described up until now. Each guide means 15, 15' and 15" comprises a guide 16, 16' and 16" that is part of the casing 3, said guide 16, 16' and 16" surrounding the insulating body 10 guiding it. In particular, each guide 16, 16' and 16" extends from the corresponding recess **3*b* of the casing 3 into the insulating base 2**.

In the embodiment shown in FIG. 4, the guide 16 is substantially cylindrical and is inserted in the insulating base 2. The guide 16 extends from a substantially planar surface of the recess 3*b* into the insulating base 2.

Figure 5:
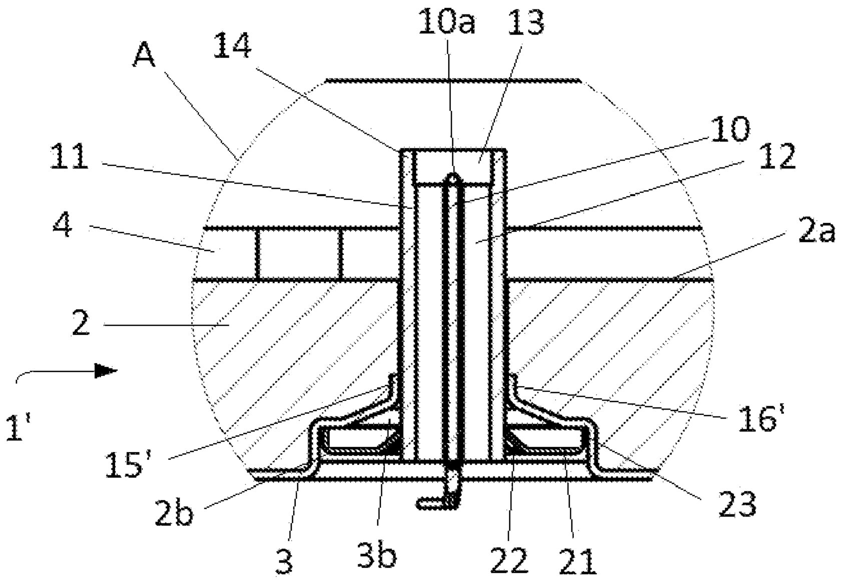
FIG. 5 shows detail A of a radiant burner according to another embodiment.
Figure 7:
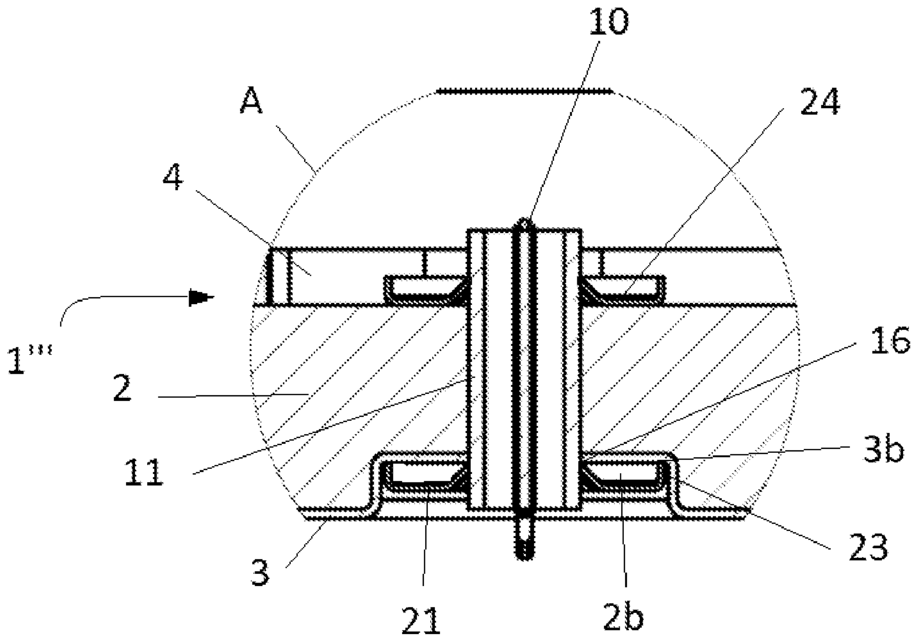
FIG. 7 shows detail A of a radiant burner according to another embodiment.

In other embodiments, shown in FIGS. 5 and 7, the guide 16' has a substantially frustoconical segment followed by a substantially cylindrical segment and is arranged partially inserted in the insulating base 2.

Figure 6:
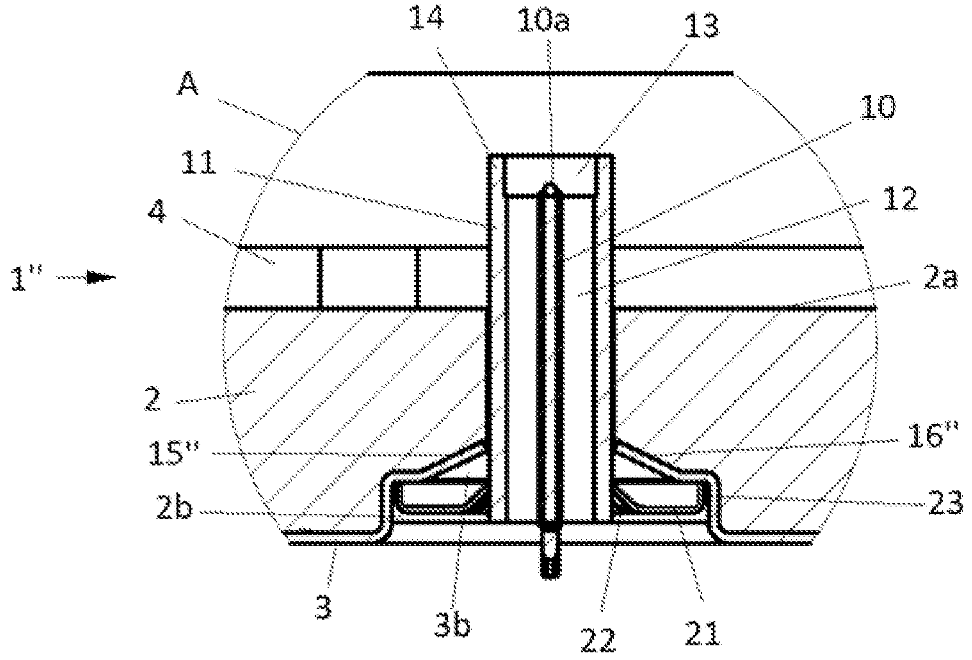
FIG. 6 shows detail A of a radiant burner according to yet another embodiment.

In another embodiment, shown in FIG. 6, the guide 16" is substantially frustoconical.

Additionally, the control means 30 of the cooking appliance 40 has a dual function: it is electronic control means configured to cut off the power supply of the heating element 4 when the temperature sensor 10 detects inside the radiant burner 1, 1', 1", 1'" and 1"" a temperature greater than a predetermined temperature, and furthermore to control/manage the power supplied to each radiant burner 1, 1', 1", 1'" and 1"" through the temperature measured by the temperature sensor 10. This latter function enables the viability of cooking in a closed loop system in which the user chooses a working temperature which is kept constant by means of the continuous monitoring of the temperature and management of the heating power of the respective radiant burner.

In a preferred embodiment, the temperature sensor 10 is a thermocouple. The thermocouple has a hot junction 10*a* supported in the insulating body 11, a cold junction arranged in a PCB of the control means 30, and a compensation circuit (not depicted) the purpose of which is to eliminate the effect caused by room temperature on the measurement. The compensation circuit comprises an NTC sensor which directly returns the temperature of that point. Therefore, to establish the temperature in the hot junction, the voltage generated in the thermocouple is measured and compensated for in the microcontroller with the temperature of the NTC.

The cooking appliance 40 shown in FIG. 1 comprises a support 41 in which the respective radiant burners 1 (in any of their described embodiments) are arranged. The control means 30 comprises a reading circuit 31 for each radiant burner 1, a user interface 35 and a power source housed in the support 41. The reading circuits 31, the interface 35 and the power source can be arranged in the same PCB or electronic support, or they can be in different PCBs or electronic supports and connected to one another. The cooking appliance 40 according to the invention enables devising the cooking appliance with less height requirements than the usual configuration, thereby considerably reducing the height for inserting the appliance into the countertop. The height of the support 41 is therefore less than about 35 mm, in particular less than 30 mm.

Figure 10:
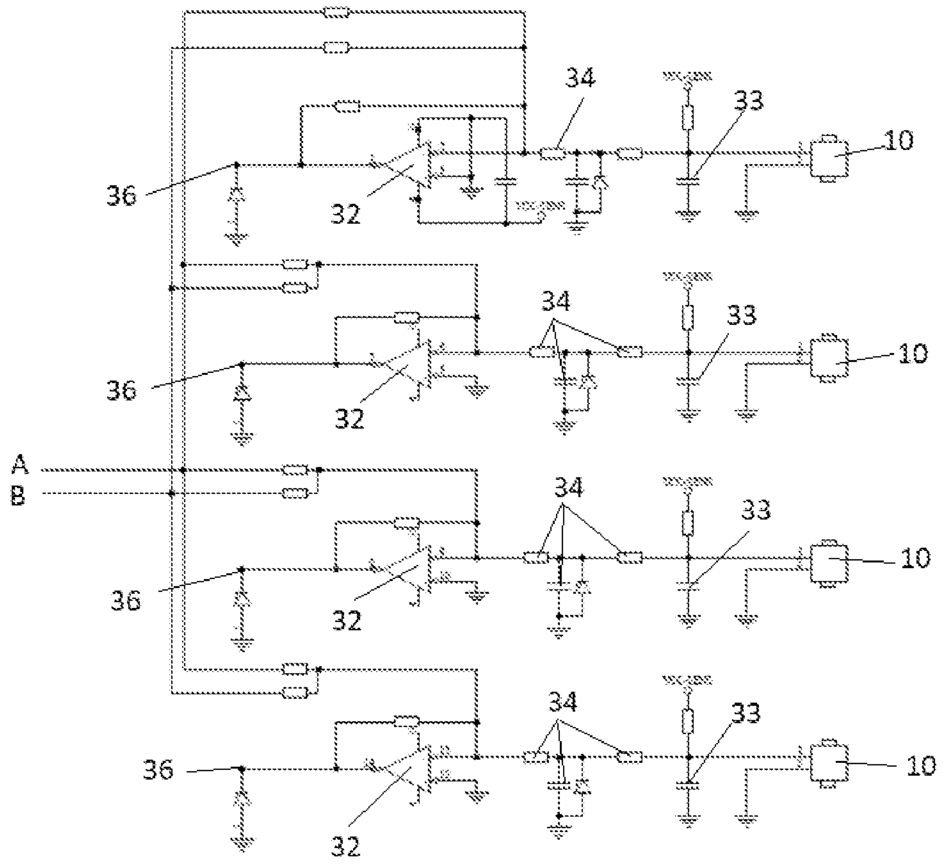
FIG. 10 shows an electrical diagram of a temperature reading circuit of a cooking appliance according to one embodiment.

FIG. 10 shows the electrical diagram of the temperature reading circuits 31 of the four radiant burners 1 shown in FIG. 1, each temperature reading circuit 31 comprising at least one voltage booster 32 connected to the thermocouple 10, where the purpose is to boost the voltage generated between the hot junction and the cold junction of the thermocouple 10 so that the interface 35 can read it. The voltage booster 31 is preferably an inverting operational amplifier, i.e., the inlet signal is amplified, and its polarity inverted. Each temperature reading circuit 31 further comprises a first capacitor 33 through which the signal is filtered and a resistor and capacitor combination (RC filter) 34 to attenuate possible interferences, noise or peaks in the signal, both the capacitor 33 and the RC filter 34 being arranged before the voltage booster 32. The voltage booster 32 is connected to a microcontroller comprised in the interface 35 of the cooking appliance 40, such that the microcontroller is capable of reading a sufficient signal.

For the purpose of ensuring that the temperature of the radiant burners 1, 1', 1", 1'", and 1"" in any of the described examples and/or embodiments, measured by the corresponding temperature sensor 10 and read by the temperature reading circuit 31, is correct, thereby ensuring that there is no electrical or thermal risk for the user, a series of controls are routinely executed in order to verify if the read temperature signal is the temperature signal corresponding to the inside of the radiant burner 1, 1', 1", 1'" and 1"" or if, on the contrary, it is due to a fault for any of the following reasons:

- short circuiting of any component of the temperature reading circuit 31 which would cause the temperature sensor to be given the same constant value at 0 V or at 5 V regardless of any variation in the power through the interface 35, etc.
- opening of the temperature reading circuit 30 due to the breaking of a track, cable of the thermocouple 10 or welded component which returns a fixed or incorrect value of the thermocouple,
- breaking of the NTC which returns a fixed value at a temperature value which does not vary,
- opening of the compensation circuit which may lead to a fixed value or an incorrect value, and/or
- damage inside the radiant burner, which may lead to an unusual variation in the read temperature signal over time either due to being excessively rapid or excessively slow.

To that end, the control method comprises the following steps:

- reading the thermocouple and controlling the temperature deviation from a predetermined range for a power level determined through the interface 35,
- verifying the existence of any short circuit in any component of the temperature reading circuit,
- verifying the existence of a break in any component of the reading circuit,
- verifying a temperature at a fixed value, and
- verifying the temperature dynamics with respect to a variation in power.

Temperature deviation is controlled by analyzing if a temperature signal, that is outside of a predetermined temperature range considered normal and established for each power level determined through the interface 35, reaches the microcontroller.

To verify the existence of a short circuit in a component of the reading circuit 31, a signal or pulse is produced, and its response is measured. In particular, the microcontroller produces a signal A which applies a change in voltage from 0 to 5 V, or vice versa, in the signal booster 32, which brings about a change in voltage in the circuit, and the response thereof in two inlets is awaited. In a first inlet B, it is verified that the signal introduced correctly reaches the signal booster 32, i.e., it is verified that there is no error in the outlet or in the intermediate components. In a second inlet, the response of signal A amplified through the signal booster 32 is measured, verifying that the signal booster 32 is or is not working properly.

When the power is varied through the interface 35, the measurement of the temperature of the sensor 10 changes, albeit a minor change. Otherwise, it can be considered that there is an anomaly in the radiant burner. Therefore, in a first instant, when the radiant burner is off and the interface 35 is acted on, the microcontroller must record an increase in temperature in a predetermined range, both in absolute value and in the temperature deviation over time. Otherwise it is considered that there is a fault. In the event that the radiant burner is operating and the user acts through the interface 35 on the power, it leads to a change in temperature due to the change in cycle of the relays that manage the on/off pulses of the sources which must be detected by the temperature sensor.

Additional embodiments are disclosed in the clause that follow.

Clause 1. A cooking appliance comprising at least one radiant burner (1; 1'; 1"; 1'"; 1"") comprising an insulating base (2), at least one heating element (4), a casing (3) which houses therein the insulating base (2) and a temperature sensor (10) to measure the temperature inside the radiant burner (1; 1'; 1"; 1'"; 1""), and control means (30) configured to cut off the power supply of the heating element (4) when the temperature sensor (10) detects inside the radiant burner (1; 1'; 1"; 1'"; 1"") a temperature greater than a predetermined temperature, the control means (30) is electronic control means configured to furthermore control the power supplied to each radiant burner (1; 1'; 1"; 1'"; 1"") through the temperature measured by the temperature sensor (10), each radiant burner (1; 1'; 1"; 1'"; 1"") comprising an insulating body (11) fixed to the insulating base (2) which extends substantially orthogonal to said insulating base (2), said insulating body (11) supporting the temperature sensor (10).

Clause 2. The cooking appliance according to the preceding clause, wherein the insulating body (11) comprises a housing (13) in which the temperature sensor (10) is housed, the temperature sensor (10) being arranged supported in the housing (13) such that side walls (14) of the housing (13) thermally protect the temperature sensor (10) from the corresponding heating element (4).

Clause 3. The cooking appliance according to any of the preceding clauses, wherein the insulating body (11) is arranged partially inserted in the insulating base (2), said insulating body (11) being retained against said insulating base (2) through retaining means (20) comprising flexible tabs (22) surrounding the insulating body (11) which are configured to retain the insulating body (11) once said insulating body (11) passes through the retaining means (20), preventing movement in the opposite direction relative to the insertion direction.

Clause 4. The cooking appliance according to the preceding clause, wherein the flexible tabs (22) are comprised in a retaining element (21; 21'; 21") which is arranged housed in a recess (2*b*) of the insulating base (2) and fixed to said insulating base (2).

Clause 5. The cooking appliance according to any of the preceding clauses, comprising guide means (15; 15'; 15") configured to guide the assembly of the insulating body (11) and keep it substantially orthogonal with respect to the insulating base (2), the guiding means (15; 15'; 15") comprising a guide (16; 16'; 16") in the casing (3) that surrounds the insulating body (11), guiding it.

Clause 6. The cooking appliance according to the preceding clause, wherein the casing (3) includes a recess (3*b*) from the substantially planar bottom of which the guide (16) substantially cylindrical extends into the radiant burner (1).

Clause 7. The cooking appliance according to the clause 5, wherein the casing (3) includes a recess (3*b*) from which the guide (16'), which includes a substantially frustoconical segment and a substantially cylindrical segment, extends into the radiant burner (1'; 1").

Clause 8. The cooking appliance according to the clause 5, wherein the casing (3) includes a recess (3*b*) from which the substantially frustoconical guide (16") extends into the radiant burner (1").

Clause 9. The cooking appliance according to any of the preceding clauses, wherein the temperature sensor (10) is arranged substantially concentric to the insulating base (2).

Clause 10. The cooking appliance according to any of the preceding clauses, wherein the temperature sensor (10) is a thermocouple.

Clause 11. The cooking appliance according to any of the preceding clauses, wherein the height of the support (41) is less than about 35 mm.

Clause 12. The cooking appliance according to any of the preceding clauses, wherein the height of the support (41) is less than about 30 mm.

Clause 13. The cooking appliance according to any of the preceding clauses, wherein the control means (30) comprise a user interface (35) comprising a microcontroller, and a temperature reading circuit (31) including at least filtering means (33, 34) connected to the thermocouple (10) configured to filter the signal measured by the thermocouple (10) and a voltage booster (32) connected to the filtering means (33, 34), the filtering means (33,34) being configured to boost the voltage generated in the thermocouple (10) after being filtered and to provide the corresponding signal to the microcontroller.

What is claimed is:

1. A radiant burner for a cooking appliance, the radiant burner comprising:

an insulating base having a recess located in a bottom thereof;

a heating element residing on or in the insulating base;

a casing in which the insulating base is housed, the casing including a recess residing in the recess of the insulating base, a part of the casing that forms the recess including a guide residing in a through opening of the insulating base;

a temperature sensor configured to measure a temperature inside the radiant burner;

an insulating body that supports the temperature sensor, a portion of the insulating body being located inside the through opening of the insulating base and inside the guide formed by the casing, the insulating body extending vertically through the insulating base and the guide.

2. The radiant heater according to claim 1, wherein the insulating body is fixed to the insulating base.

3. The radiant heater according to claim 1, wherein the insulating body is fixed to the guide.

4. The radiant heater according to claim 1, wherein the insulating body is fixed to the insulating base and to the guide.

5. The radiant heater according to claim 1, wherein the guide surrounds the portion of the insulating body.

6. The radiant heater according to claim 5, wherein the guide is substantially cylindrical.

7. The radiant heater according to claim 1, wherein the guide is a substantially frustoconical guide.

8. The radiant heater according to claim 1, wherein the guide includes a substantially frustoconical segment and a substantially cylindrical segment, the substantially frustoconical segment being located below the substantially cylindrical segment.

9. The radiant heater according to claim 1, wherein the insulating body includes a housing formed by one or more side walls, the temperature sensor being at least partially housed and supported inside the insulating body, the temperature sensor being arranged supported in the housing such that the one or more side walls of the housing thermally protect the temperature sensor from the heating element.

10. The radiant heater according to claim 1, wherein the temperature sensor is arranged concentric to the insulating base.

11. The radiant heater according to claim 1, wherein the temperature sensor is a thermocouple.

* * * * *